United States Patent [19]

Mortenson

[11] 4,121,855
[45] Oct. 24, 1978

[54] HAND TRUCK CONSTRUCTION

[75] Inventor: Carl N. Mortenson, Midland, Mich.

[73] Assignee: Magline, Inc., Pinconning, Mich.

[21] Appl. No.: 797,501

[22] Filed: May 11, 1977

[51] Int. Cl.$^2$ ............................................. B62B 11/00
[52] U.S. Cl. .................................. 280/654; 280/47.29
[58] Field of Search ...................... 280/654, 652, 47.27, 280/47.28, 47.29, 79.3; 29/525, 450; 108/111, 134, 135; 248/240.1, 242; 403/255, 252, 248

[56] References Cited

U.S. PATENT DOCUMENTS

| 2,662,645 | 12/1953 | Piton | 108/135 |
|---|---|---|---|
| 2,693,968 | 11/1954 | Bateman | 280/654 |
| 3,804,432 | 4/1974 | Lehrman | 280/654 |
| 3,827,707 | 8/1974 | Bierman | 280/654 |
| 4,040,642 | 8/1977 | David | 280/654 |

*Primary Examiner*—Robert R. Song

*Attorney, Agent, or Firm*—Learman & McCulloch

[57] ABSTRACT

A hand truck construction comprising a wheeled, upright frame having at its lower end a load-supporting nose member swingable between raised and lowered positions. The nose member is spring biased to its raised position and the frame and the nose member are provided with a releasable latch mechanism for releasably latching the nose member in its lowered operative, load bearing position. Flexible, reinforcing cables extend between the frame and the nose member to maintain the latter substantially normal to the frame under heavy loads, the connection of the cables being such as to assure movement of the cables to positions inwardly of the sides of the frame in response to movement of the nose member to its raised position, thereby enabling the cables at all times to be maintained within the confines of the frame.

21 Claims, 8 Drawing Figures

HAND TRUCK CONSTRUCTION

The invention herein disclosed relates to a hand truck of the kind having a load-supporting nose member swingable between raised and lowered positions by means of which the truck will occupy a minimum of space when not in use, the nose member being capable of supporting substantial loads when swung to its lowered position.

It is not uncommon to provide a hand truck with a load-supporting nose member swingable between projected and retracted positions, thereby enabling the truck to be used in the transport of goods and occupy less space when not in use than would be the case if the nose member were not swingable. When utilizing a swingable or foldable load-supporting nose member, however, care must be taken to assure that it will be capable of supporting heavy loads without collapsing or becoming sprung. It thus is not uncommon for such nose members to be reinforced from underneath, but such reinforcements often protrude beyond the nose member when the latter is swung to a retracted position, thereby defeating to some extent the advantages obtained by the swingable nose member.

When a hand truck is provided with swingable load-supporting nose member it is desirable that the nose member be stable in either its projected or retracted position, thereby facilitating fitting of the nose member under loads to be transported and precluding inadvertent movement of the nose member from its retracted position to its projected position. Hand trucks of the general class to which the invention relates heretofore in use have not been capable of obtaining these desirable objectives without the provision of mechanisms which often are complex, cumberson, or difficult and time-consuming to manipulate.

A hand truck constructed in accordance with the invention includes an upright, wheeled frame at the lower end of which is pivoted a load-supporting nose member for swinging movements between raised and lowered positions. Reinforcing, flexible brace cables interconnect the frame and the nose member to enable the latter to support heavy loads without damage, and the reinforcing cables are so connected to the frame and to the nose member that, when the latter is swung to its raised position, the cables automatically are directed inwardly of the sides of the frame to occupy a position wholly within the confines of the frame. The nose member normally is biased by spring means of simple construction to its raised position, but is provided with releasable latch means for releasably maintaining the nose member in its lowered or projected position until such time as movement of the nose member to its raised position is desired.

A hand truck constructed according to the invention is disclosed in the accompanying description and drawings, wherein.

Figure 1:
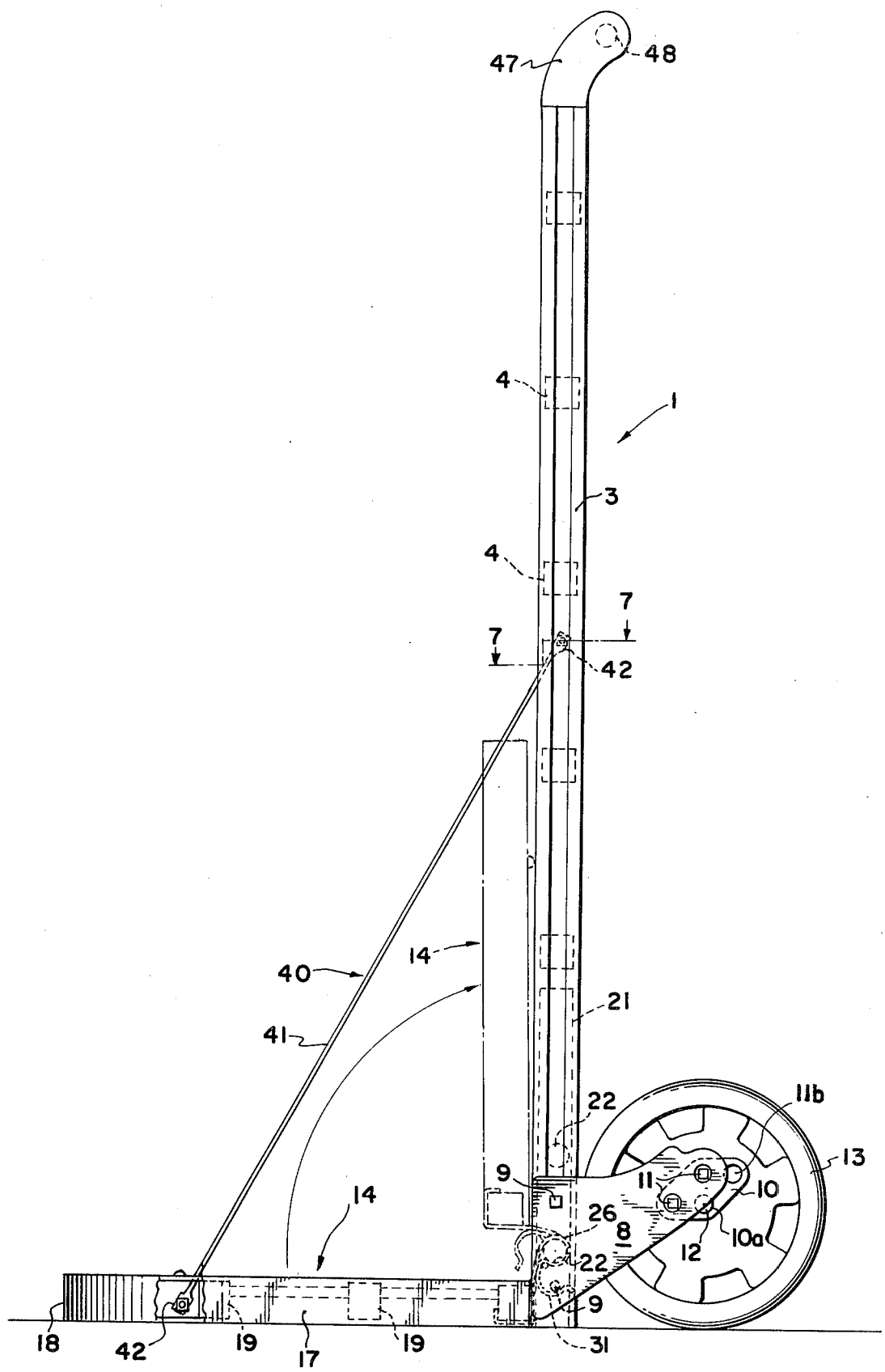
FIG. 1 is a side elevational view of the hand truck with the nose shown in "down" position and the chain lines indicating the "folded" position thereof.

A hand truck constructed in accordance with the invention comprises an upright frame generally designated 1 having a pair of parallel members 2 and 3 spaced apart by crossbars 4. Each of the members 2 and 3 is the same and comprises a channel-shaped beam having front and rear legs 5 and 6, respectively, joined by a web 7. The crossbars 4 fit between the legs 5 and 6 of the respective frame members and are secured thereto by rivets, bolts, or the like (not shown).

Adjacent the lower end of each frame member 2 and 3 a wheel axle mounting bracket 8 is secured as by keys (not shown) and bolts 9. Each bracket supports a plate 10, by means of bolts 11, and in each plate 10 are openings 10a for fixing an axle 12 at the opposite ends of which is journaled a pair of ground-engaging wheels 13. Openings 10b alternatively would be used to support axle 12 if larger diameter wheels 13 are to be employed and the wheels can be mounted inboard or outboard of brackets 8.

The hand truck also includes a load-supporting platform or nose member 14 comprising a U-shaped frame 15 having parallel rails or legs 16 and 17 spaced by a forward web 18 having rounded corners. The frame 15 preferably is composed of a channel member which receives the opposite ends of crossbars 19 which are welded, riveted, bolted, or otherwise suitably secured to the member 15.

Figure 5:
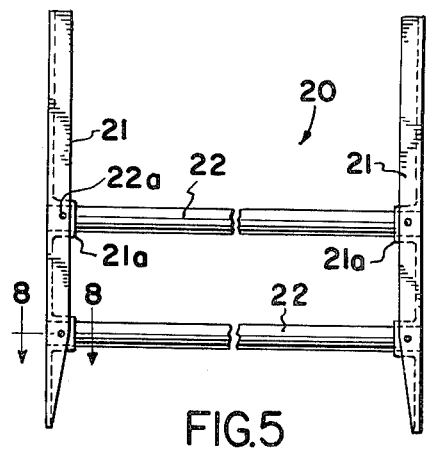
FIG. 5 is an elevational view of reinforcing structure forming part of the frame.
Figure 6:
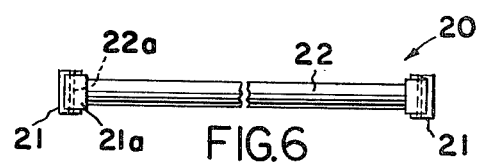
FIG. 6 is an end view of the structure shown in FIG. 5.

Dual purpose means is provided for pivotally mounting the nose member 14 at the lower end of the frame and comprises a reinforcing sub-frame 20 (FIGS. 5 and 6) having a pair of die cast parallel side bars 21 joined by tubular cross members 22 which are received by the hubs 21a cast on side bars 21 and extend at each end into engagement with the side frame members 2 and 3. Pins or bolts 22a may be used to secure the braces 22 in position. The side members 21 are of such width as to closely fit between the front and rear legs 5 and 6 of the associated frame members 2 and 3 to reinforce the frame and the cross members 22 span the distance between the frame members 2 and 3 to brace the frame. The lower cross member 22 serves also as a pivot support for the nose piece 14. The subframe 20 interfits with and is fixed with respect to the frame 1 by bolts 9.

Forming part of the mounting means for the nose member 14 is a pair of hanger straps 25 located one adjacent each end of the rearmost crossbar 19 and fixed to the latter in any suitable manner. Each strap terminates at its upper end in an arcuate portion 26 which overlies and engages the lower tubular member 22, the curvature of the portion 26 corresponding to that of the member 22. The nose member 14 thus is capable of swinging movement about a radius having its center C at the longitudinal axis of the tubular member 22.

Figure 4:
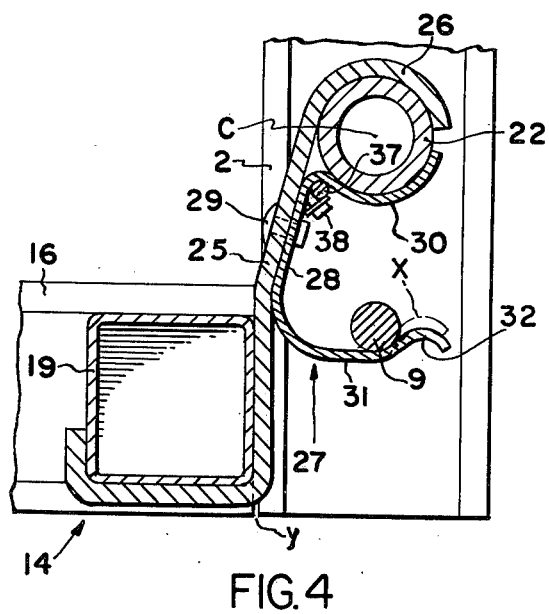
FIG. 4 is an enlarged sectional view taken on the line 4—4 of FIG. 2.

A combined retainer and latching member 27 is associated with each hanger member 25 and comprises (see FIG. 4) a strip of spring steel having a central portion 28 thereof fixed to the strap 25 by a rivet 29 or the like and terminating at its upper end in an arcuate portion 30 formed on a radius corresponding to that of the tubular member 22, the arcuate portion 30 embracing the member 22. The lower end of the central portion 28 of each member 27 is smoothly rounded to merge into a rearwardly extending deflectable spring finger 31 terminating at its free end in an arcuate latching detent 32 which is adapted to be engaged with and disengaged from the inwardly projecting end of one of the lower bolts 9 by means of which the associated wheel supporting bracket 8 is mounted on the frame 1. The arrangement is such that, when the nose member 14 is in the lowered or projecting position shown in FIG. 4, the nose member is yieldably latched in such position by the engagement of the latching detents 32 with the associated bolts 9, spring fingers 31 being deflected from the position shown at X in FIG. 4 (which is slightly exagerated) to aid in the latching operation.

Figure 2:
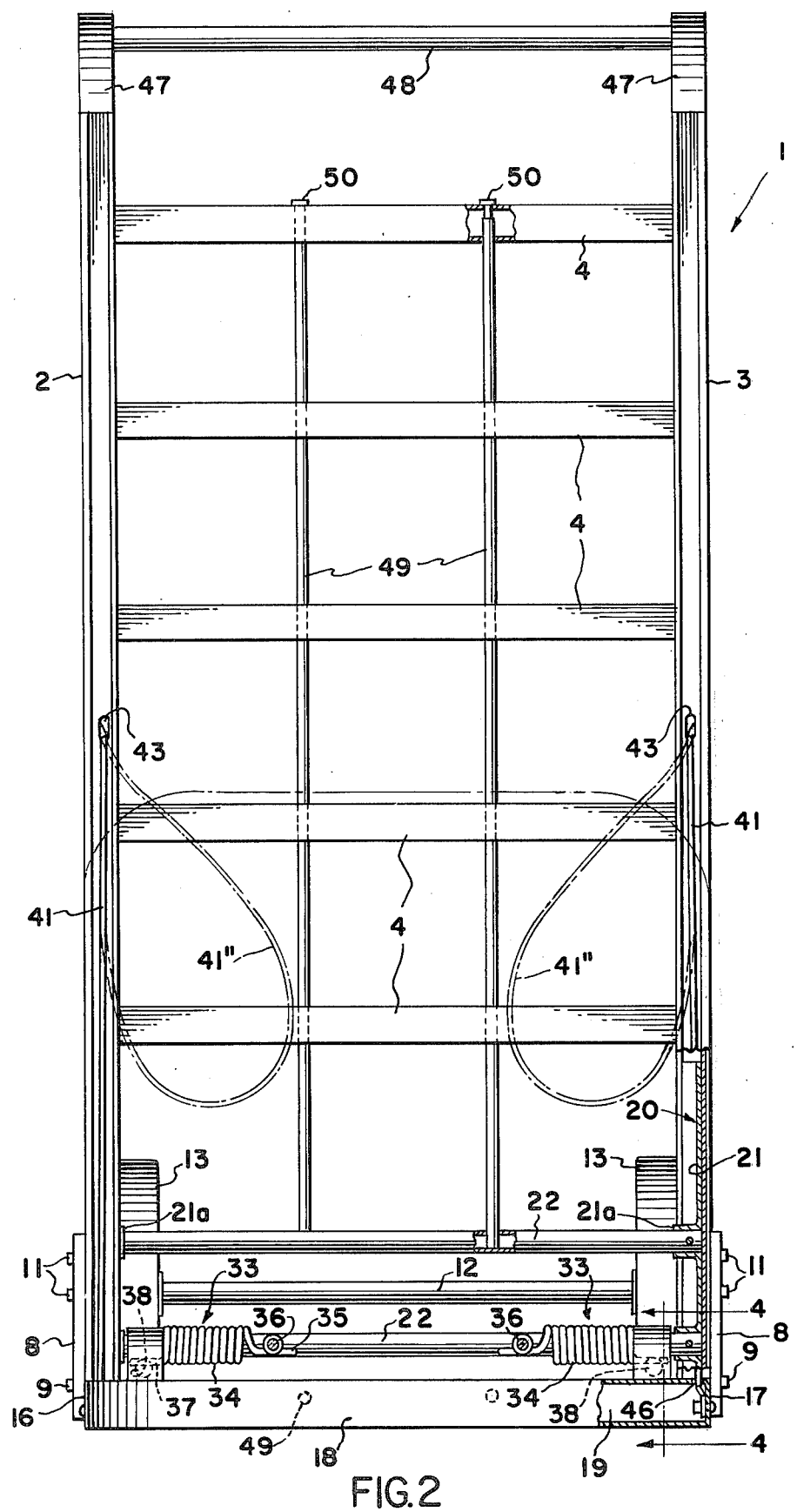
FIG. 2 is a front elevational view, with parts broken away for purposes of illustration and the chain lines indicating the "folded" position of the reinforcing cables.
Figure 3:
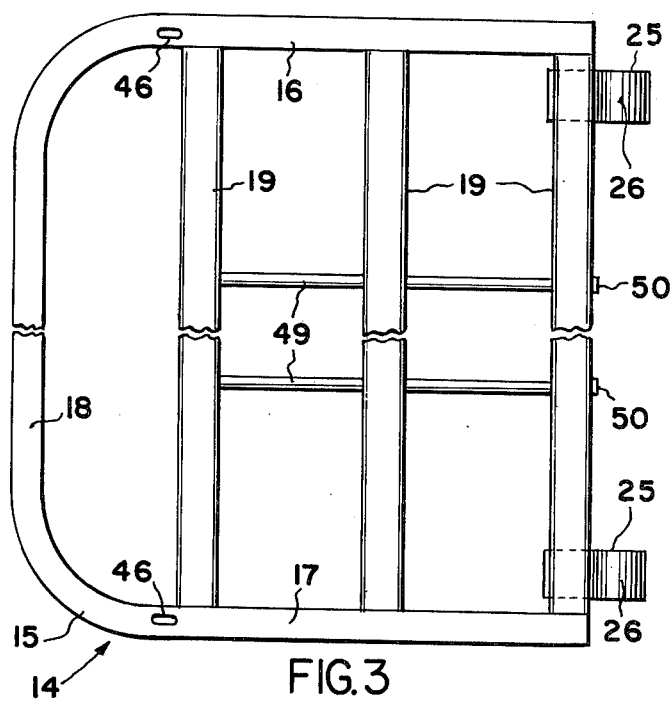
FIG. 3 is a top plan view of the nose member.

Resilient means constantly acts on the nose member 14 to bias it toward its raised or retracted position and comprises a pair of torsion springs 33 (FIG. 2) located at opposite ends of the tubular member 22. Each torsion spring includes a coil 34 encircling the member 22 and having one end thereof anchored to the member 22 by a clamp 36. The opposite end 37 of each spring underlies the associated member 27 and is fixed with respect thereto by a clamp 38. The arrangement is such that the springs 33 bias the member 14 to its raised position with sufficient force to maintain the nose member in the retracted position shown in chain lines in FIG. 1 and prevent its inadvertent movement to its projected position. The force exerted on the nose member by the springs, however, is not sufficient to unlatch the latching parts 9 and 32 when the nose member is in its lowered or projected position.

Figure 7:
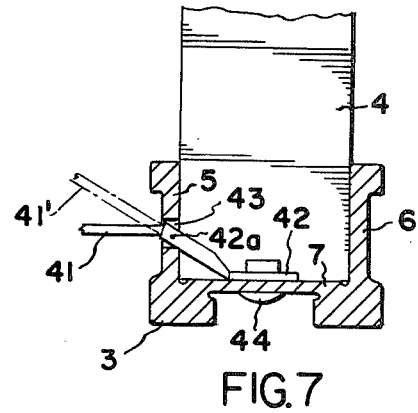
FIG. 7 is an enlarged sectional view taken on the line 7—7 of FIG. 1.
Figure 8:
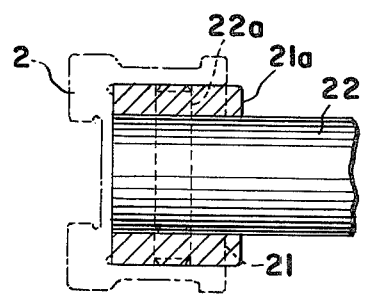
FIG. 8 is an enlarged fragmentary sectional plan view, illustrating the manner in which reinforcement frame brace members are received by the hubs cast in the reinforcement frame side members.

Reinforcing means 40 act between the frame 1 and the nose member 14 to enable the latter to support substantial loads in its projected position without risking damage. The reinforcing means comprises a pair of elongate, twisted wire brace cables 41 provided with a swaged-on sleeve 42a with an eyelet termination 42 at each end. The sleeved upper end of each cable 41 passes through a slot 43 formed in the forward leg 5 of the associated frame member 2 or 3 and the upper eyelet 42 is fixed to the associated web 7 by a suitable fastener 44. As is best shown in FIG. 7, the opening 43 is inwardly offset from the plane of the web 7, thereby enabling the sleeve 42a to direct the stiffish cable normally to the 41' position or toward the opposite frame member. The legs 16 and 17 of the nose member 14 are provided with slots 46 similar to the slots 43 and through which the sheathed lower ends of the brace cables 41 pass, the slots 46 being similarly offset inwardly from the marginal edge of the legs 16 and 17 so that the lower ends of the cables between the eyelets 42 and the slots 46 are similarly directed inwardly of the nose member 14 by the sleeves 42a which sheath them.

When the nose member 14 is moved to its lowered or projected position in which a space y remains between nose member 14 and the lower ends of side rails 3, each of the cables is brought taut to define a straight line between the associated slots 43 and 46, thereby enabling the cables to brace and support the nose member 14 in a projected position substantially normal to the frame 1. The cables lie wholly within the confines of the members 1 and 14 in this position and, when the nose member 14 is swung upwardly to its retracted position indicated in chain lines in FIGS. 1 and 2, upward movement of the member 14 will introduce slack into the cables 41.

As the cables slacken, the sleeves 42a on the ends of cables 41 extending at an inward angle through the respective slots 43 and 46 will direct each of the cables 41 inwardly to form a bow, as indicated in chain lines at 41' in FIG. 7, thereby assuring maintenance of the cable wholly within the confines of the respective members 1 and 14. By the time the nose member 14 is in its fully retracted position, each of the cables 41 will form a loop 41", as indicated in chain lines in FIG. 2, and will be retained in projected position between the frame member 1 and the nose member 14. With the construction described, flat cable stowing is assured.

To facilitate handling of the hand truck, the upper end of each frame member 2 and 3 is provided with an angular bracket 47, the brackets being spanned by a bar 48 which functions as a handlebar.

A general purpose hand truck should be capable of handling both large and small objects. To enable a hand truck to accommodate small objects, however, the spaces between adjacent frame members might be reduced. It has been conventional heretofore to provide a lattice-like frame structure composed of metal parts similar to the main frame members themselves, but the use of metal is expensive. A hand truck according to the invention may be equipped to accommodate small objects by means of inexpensive, elongate fiberglass rods 49. The rods 49 are fitted to the frame 1 by drilling openings in each of the cross members 4 and by drilling an opening in the upper wall only of the lowermost tubular member 22 of the sub-frame 20. A rod 49 then may be run through such openings and be retained by a plastic plug 50 driven (press fitted) into the upper opening of the uppermost crossbar 4 to engage the upper end of the rod 49. The rods 49 for the nose member 14 are similarly installed.

The disclosed embodiment is representative of a presently preferred form of the invention, but is intended to be illustrative rather than definitive thereof. The invention is defined in the claims.

What is claimed is:

1. In a hand truck construction comprising an upright frame including a pair of spaced apart upright rails; bracket means at the lower end of said frame extending rearwardly therefrom and having axle means spaced rearward of the lower end of said frame for supporting ground engaging wheels; wheels thereon; and a nose member; the improvement wherein a subframe, including leg parts received by the rails and spanned by a brace part, is spaced vertically from the upper end of the upright frame and nests between said rails in the plane of said upright frame to brace the rails in spaced apart relation and to provide increased load carrying strength for the lower end of the frame, the brace part being spaced forwardly of and below the axle means, and the nose member being mounted for pivotal movement on the brace part for swinging movements between a raised position and a lowered position in which it extends along the ground at the level of the lower periphery of the wheels.

2. A construction according to claim 1 including releasable latch means acting between said frame and said nose member for releasably latching the latter in said lowered position and biasing means acting between said frame and said nose member is provided for urging the latter to its raised position.

3. A construction according to claim 2 wherein strap means mounted by said nose member pivots on said brace part and said latch means mount on said strap means in position to be swung into locked engagement with said frame.

4. A construction according to claim 2 wherein flexible brace members connect between the frame and nose member for bracing the nose member in the lowered position and the connections of said flexible member to said frame and said nose member are such that movement of said nose member toward its raised position causes said flexible member to bow in a predetermined direction laterally of its length.

5. A hand truck construction comprising a frame; means at one end of said frame supporting ground engaging wheels; a nose member; means mounting said nose member on said frame member adjacent said one end thereof for swinging movements between raised and lowered positions; at least one elongate, flexible brace member connected at one end thereof to said nose member and at the opposite end thereof to said frame member, said brace member forming a straight line between said frame and said nose member when the latter is in said horizontal position to brace said nose member; and means acting on said brace adjacent at least one end of the latter for directing said brace in one direction laterally of said straight line in response to movement of said nose member from its lowered position toward its raised position.

6. A construction according to claim 5 wherein the means for directing said brace member acts on that end of said brace member adjacent said frame member.

7. A construction according to claim 5 wherein the means for directing said brace member comprises a part carried by said brace member adjacent said opposite end thereof.

8. A construction according to claim 7 wherein said part comprises a sleeve member adapted to be fixed to said frame and to extend through an opening in said frame.

9. A construction according to claim 5 including a second brace member corresponding to the first-mentioned brace member and connected at its opposite ends to said nose member and to said frame member.

10. A hand truck construction comprising a frame having a pair of spaced apart uprights; means at the lower ends of said uprights for supporting ground engaging wheels; a nose member having spaced apart side rails; means pivotally mounting said nose member at the lower end of said frame for movements between raised and lowered positions; a pair of elongate, flexible brace members; means connecting said brace members to said frame and to said nose member with one brace member extending from one upright to one rail and the other brace member extending from the other upright to the other of said rails, said brace members being operable when said nose member is in its lowered position to support said nose member substantially normal to said frame; and means connecting said frame with each of said brace members in a manner to exert a directing force on the associated brace member toward the opposite upright, whereby each of said brace members is directed away from its associated upright toward the other upright in response to movement of said nose member toward its raised position.

11. A construction according to claim 10 including releasable spring latching means acting between said frame and said nose member for releasably latching the latter in its lowered position.

12. A construction according to claim 11 including spring means, which cannot overcome said spring latching means when the latter is latching the nose member in lowered position, acts between said frame and said nose member for biasing the latter toward its raised position.

13. A hand truck construction comprising a frame; means at one end of said frame for supporting ground engaging wheels; a nose member; means mounting said nose member adjacent said one end of said frame for swinging movements between raised and lowered positions; and automatically releasable latch means acting between said frame and said nose member for releasably latching the latter in said lowered position.

14. The construction according to claim 13 in which said latch means are deflectable spring steel members.

15. A construction according to claim 13 including biasing means acting between said frame and said nose member and urging the latter to its raised position, said biasing means exerting less force than required to release said deflectable spring latch means.

16. The combination defined in claim 13 in which said latch means comprises deflectable spring fingers carried by said nosepiece and engageable with fixed surface means provided on said frame.

17. In a hand truck construction including an upright skeletal frame comprising upright side rails joined by a plurality of vertically spaced transverse braces; means at the lower end of the frame for supporting ground engaging wheels; and a nose member projecting from the lower end of the frame; the improvement wherein vertically aligned openings are provided at spaced intervals in said braces, rods extend through said openings except for the lowermost brace in which said openings are provided, and fasteners for said openings which overlie the uppermost brace through which the rods extend include body portions received with a press fit and flanges overlying the said uppermost brace.

18. The construction of claim 16 wherein the said body portions are press fitted into the upper ends of the openings in said uppermost braces.

19. In a hand truck construction comprising an upright frame; means at the lower end of said frame for supporting ground engaging wheels; a load supporting nose member; and means mounting said nose member at the lower end of the frame for swinging movements between raised and lowered positions; the improvement wherein automatically releasable spring held latch means acts between the frame and nose member for releasably latching the latter in lowered position, and spring means exerting a lesser force than said spring held latch means constantly biases the subframe oppositely to raised position against the restraining force of the latch means; said latch means including a part mounted on the frame in the path of movement of said nose member and a part on the nose member operating such that latching engagement of the parts occurs when the nose member swings down to lowered position.

20. In the apparatus of claim 19, the further improvement wherein one part is a deflectable spring part and the other part is a more rigid spring deflecting part.

21. The apparatus of claim 20 in which said deflectable spring part is on the nose part and functions also as means mounting the nose member for swinging movements.

* * * * *